US012679673B1

(12) United States Patent
    Marculescu et al.

(10) Patent No.:     US 12,679,673 B1
(45) Date of Patent:        Jul. 14, 2026

(54) SHUTTLE HEIGHT MONITORING SYSTEMS FOR SHUTTLES POWERED BY LINEAR SYNCHRONOUS MOTORS

(71) Applicant: Amazon Technologies, Inc., Seattle, WA (US)

(72) Inventors: Alexandru Marculescu, Wingrave (GB); Thys Burger, Dunstable (GB); Cristiano Ascani, Rome (IT)

(73) Assignee: Amazon Technologies, Inc., Seattle, WA (US)

( * ) Notice: Subject to any disclaimer, the term of this patent is extended or adjusted under 35 U.S.C. 154(b) by 139 days.

(21) Appl. No.: 18/819,063

(22) Filed: Aug. 29, 2024

(51) Int. Cl.
    B65G 54/02        (2006.01)
    B65G 69/28        (2006.01)

(52) U.S. Cl.
    CPC ......... B65G 54/02 (2013.01); B65G 69/2882 (2013.01); B65G 2203/0266 (2013.01); B65G 2203/041 (2013.01); B65G 2811/0673 (2013.01)

(58) Field of Classification Search
    CPC ................ B65G 54/02; B65G 69/2882; B65G 2811/0673; B65G 2203/0266; B65G 2203/0275; B65G 2203/0283; B65G 2203/041
    See application file for complete search history.

(56) References Cited

U.S. PATENT DOCUMENTS

| | | | | |
|---|---|---|---|---|
| 6,768,551 | B2 * | 7/2004 | Mian ........................ | B61K 9/12 |
| | | | | 356/612 |
| 11,535,459 | B2 * | 12/2022 | Lautenschlager ...... | B65G 43/00 |
| 11,757,342 | B2 * | 9/2023 | Choumach ............. | H02K 11/20 |
| | | | | 310/12.01 |
| 11,767,174 | B2 * | 9/2023 | Das ........................ | B65G 43/00 |
| | | | | 198/502.3 |
| 11,831,360 | B2 * | 11/2023 | Krishnamoorthy ..... | H04W 4/80 |
| 11,945,665 | B1 * | 4/2024 | Lais ........................ | B65G 54/02 |
| 12,240,711 | B1 * | 3/2025 | Bray ........................ | B65G 54/02 |
| 12,304,533 | B1 * | 5/2025 | Dwivedi ............. | B65G 1/0492 |
| 2021/0371205 | A1 * | 12/2021 | Mutarelli ............ | B65G 1/1373 |
| 2024/0375518 | A1 * | 11/2024 | Huang ..................... | B60L 3/12 |

\* cited by examiner

*Primary Examiner* — Mark A Deuble

(74) *Attorney, Agent, or Firm* — Eversheds Sutherland (US) LLP

(57) ABSTRACT

Systems and methods are disclosed for shuttle height monitoring systems for shuttles powered by linear synchronous motors. An example system may include a track, a first sensor disposed adjacent to the track, a second sensor disposed adjacent to the track, a third sensor disposed adjacent to the second sensor, and a controller. The controller may be configured to determine, using the third sensor, that the first shuttle is adjacent to the first sensor, determine, using the first sensor, a first distance between a first lower portion of the first shuttle and the first sensor, determine, using the second sensor, that the second shuttle is adjacent to the first sensor, and determine, using the first sensor, a second distance between a second lower portion of the second shuttle and the first sensor.

20 Claims, 9 Drawing Sheets

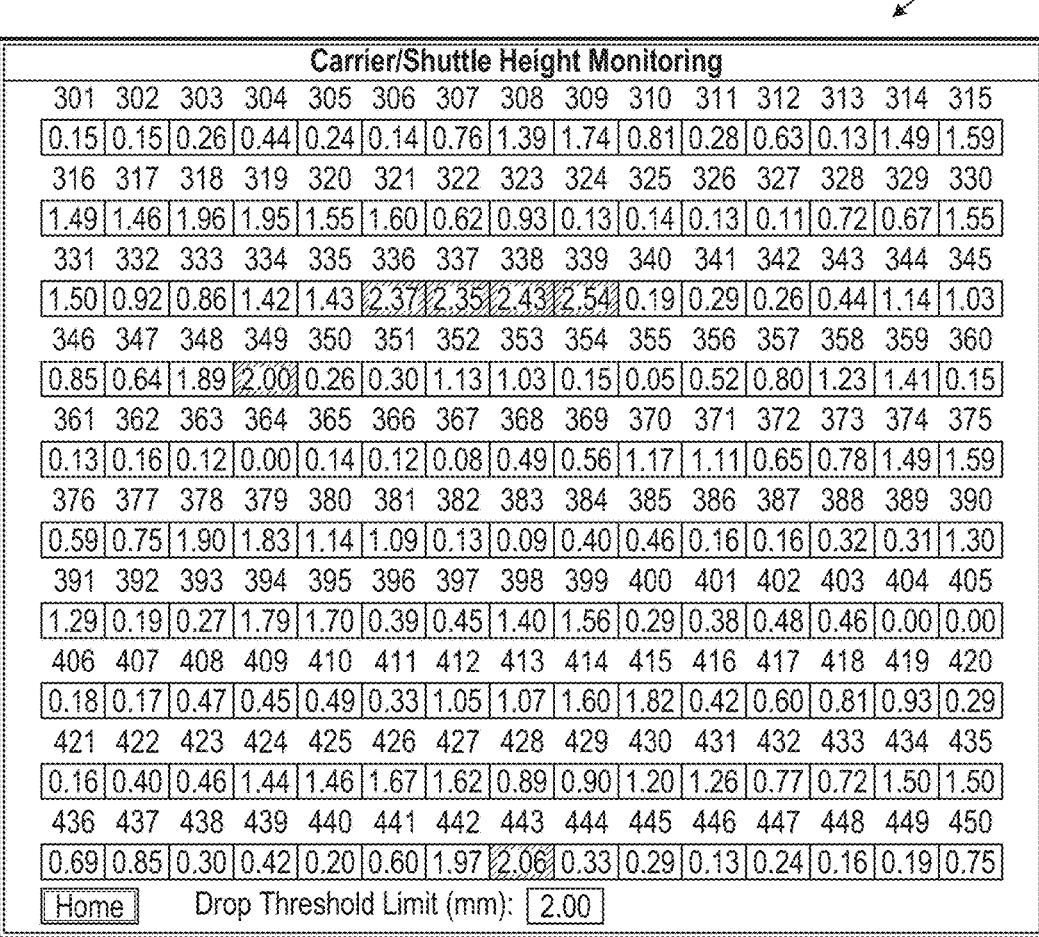

Carrier/Shuttle Height Monitoring

| 301 | 302 | 303 | 304 | 305 | 306 | 307 | 308 | 309 | 310 | 311 | 312 | 313 | 314 | 315 |
|------|------|------|------|------|------|------|------|------|------|------|------|------|------|------|
| 0.15 | 0.15 | 0.26 | 0.44 | 0.24 | 0.14 | 0.76 | 1.39 | 1.74 | 0.81 | 0.28 | 0.63 | 0.13 | 1.49 | 1.59 |
| 316 | 317 | 318 | 319 | 320 | 321 | 322 | 323 | 324 | 325 | 326 | 327 | 328 | 329 | 330 |
| 1.49 | 1.46 | 1.96 | 1.95 | 1.55 | 1.60 | 0.62 | 0.93 | 0.13 | 0.14 | 0.13 | 0.11 | 0.72 | 0.67 | 1.55 |
| 331 | 332 | 333 | 334 | 335 | 336 | 337 | 338 | 339 | 340 | 341 | 342 | 343 | 344 | 345 |
| 1.50 | 0.92 | 0.86 | 1.42 | 1.43 | 2.37 | 2.35 | 2.43 | 2.54 | 0.19 | 0.29 | 0.26 | 0.44 | 1.14 | 1.03 |
| 346 | 347 | 348 | 349 | 350 | 351 | 352 | 353 | 354 | 355 | 356 | 357 | 358 | 359 | 360 |
| 0.85 | 0.64 | 1.89 | 2.00 | 0.26 | 0.30 | 1.13 | 1.03 | 0.15 | 0.05 | 0.52 | 0.80 | 1.23 | 1.41 | 0.15 |
| 361 | 362 | 363 | 364 | 365 | 366 | 367 | 368 | 369 | 370 | 371 | 372 | 373 | 374 | 375 |
| 0.13 | 0.16 | 0.12 | 0.00 | 0.14 | 0.12 | 0.08 | 0.49 | 0.56 | 1.17 | 1.11 | 0.65 | 0.78 | 1.49 | 1.59 |
| 376 | 377 | 378 | 379 | 380 | 381 | 382 | 383 | 384 | 385 | 386 | 387 | 388 | 389 | 390 |
| 0.59 | 0.75 | 1.90 | 1.83 | 1.14 | 1.09 | 0.13 | 0.09 | 0.40 | 0.46 | 0.16 | 0.16 | 0.32 | 0.31 | 1.30 |
| 391 | 392 | 393 | 394 | 395 | 396 | 397 | 398 | 399 | 400 | 401 | 402 | 403 | 404 | 405 |
| 1.29 | 0.19 | 0.27 | 1.79 | 1.70 | 0.39 | 0.45 | 1.40 | 1.56 | 0.29 | 0.38 | 0.48 | 0.46 | 0.00 | 0.00 |
| 406 | 407 | 408 | 409 | 410 | 411 | 412 | 413 | 414 | 415 | 416 | 417 | 418 | 419 | 420 |
| 0.18 | 0.17 | 0.47 | 0.45 | 0.49 | 0.33 | 1.05 | 1.07 | 1.60 | 1.82 | 0.42 | 0.60 | 0.81 | 0.93 | 0.29 |
| 421 | 422 | 423 | 424 | 425 | 426 | 427 | 428 | 429 | 430 | 431 | 432 | 433 | 434 | 435 |
| 0.16 | 0.40 | 0.46 | 1.44 | 1.46 | 1.67 | 1.62 | 0.89 | 0.90 | 1.20 | 1.26 | 0.77 | 0.72 | 1.50 | 1.50 |
| 436 | 437 | 438 | 439 | 440 | 441 | 442 | 443 | 444 | 445 | 446 | 447 | 448 | 449 | 450 |
| 0.69 | 0.85 | 0.30 | 0.42 | 0.20 | 0.60 | 1.97 | 2.06 | 0.33 | 0.29 | 0.13 | 0.24 | 0.16 | 0.19 | 0.75 |

Home    Drop Threshold Limit (mm): 2.00

500

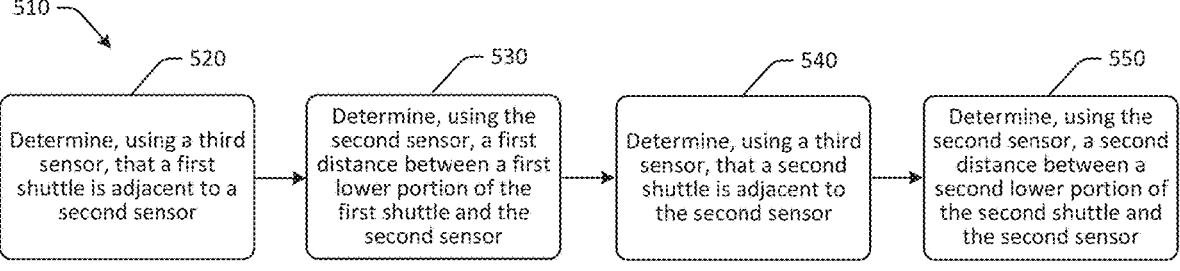

510

520 — Determine, using a third sensor, that a first shuttle is adjacent to a second sensor 530 — Determine, using the second sensor, a first distance between a first lower portion of the first shuttle and the second sensor 540 — Determine, using a third sensor, that a second shuttle is adjacent to the second sensor 550 — Determine, using the second sensor, a second distance between a second lower portion of the second shuttle and the second sensor

FIG. 5A

SHUTTLE HEIGHT MONITORING SYSTEMS FOR SHUTTLES POWERED BY LINEAR SYNCHRONOUS MOTORS

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

BRIEF DESCRIPTION OF THE DRAWINGS

FIGS. 5A-5B are schematic illustrations of various views of a shuttle height monitoring system user interface and shuttle height changes over time in accordance with one or more example embodiments of the disclosure.

Figure 1:
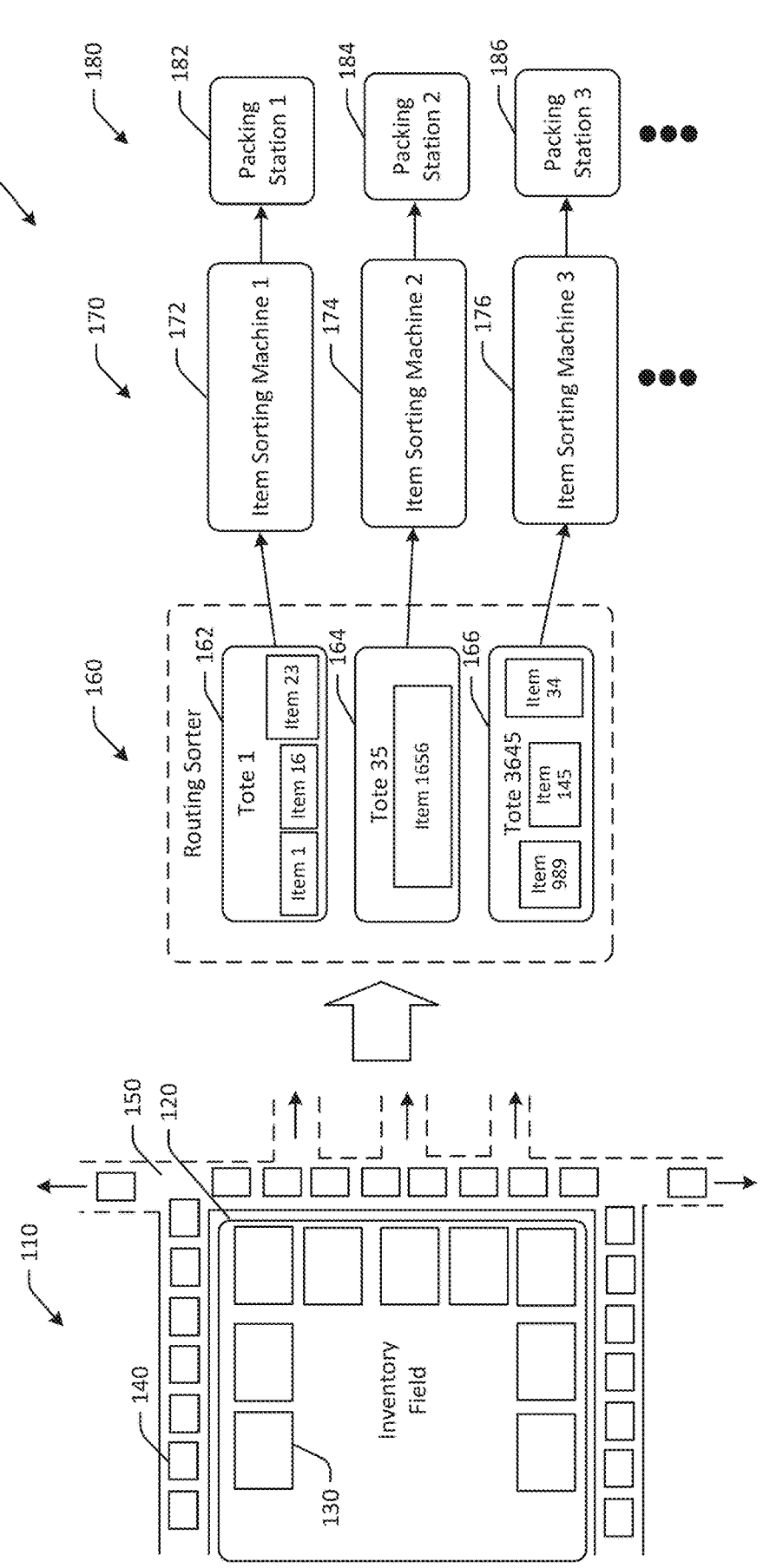
FIG. 1 is a hybrid schematic illustration of an example use case for shuttle height monitoring systems for shuttles powered by linear synchronous motors in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, in some facilities, a container of items may be loaded onto a shuttle, and the shuttle may transport the container from an inventory field to a sortation system or other location.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle. During movement, shuttles may experience wear and tear, and may require maintenance for various components. Some shuttle components may be more expensive and/or complicated to service than others. For example, shuttle wheels may be inexpensive and less complicated to repair or replace relative to electronic components of the shuttle. In addition, shuttle wheels may wear quickly relative to other shuttle components. However, wheels and other components may wear at different rates for different shuttles. This may result in different heights for individual shuttles relative to a distance from a track, and in particular, relative to electromagnets disposed along the track. This can create issues related to shuttle performance, particularly when driven by linear synchronous motors. As a result, accurately determining when to replace or repair shuttle components that lead to changes in shuttle height may improve performance relative to a one size fits all approach. Optimal determination of a status of shuttle heights may be while the shuttle is in motion, so as to avoid taking shuttles offline for an inspection.

Embodiments of the disclosure determine shuttle height statuses while the shuttle moves along the track and without requiring the shuttle to stop or be removed from service. Some embodiments use photoelectric sensors, cameras, and/or other sensors to detect and/or determine shuttle height measurements. Based at least in part on measurements and/or images of shuttle height, shuttles can be automatically routed to maintenance bays or service areas for component replacement or repair. As a result, maintenance can be customized for individual shuttles. Some embodiments monitor the condition of shuttle heights continuously and identify potential issues before failure. In one embodiment, sensors may be placed in a side-mounted configuration adjacent to a shuttle track, and in another embodiment, sensors may be placed in an upward-facing configuration underneath a shuttle track. Shuttles may be used to transport the one or more items from a first location to a second location. Moreover, in addition to transporting items using shuttles without containers, embodiments include manual induction stations that can be disposed adjacent to a track along which shuttles move. The induction stations may allow for items to be inducted or otherwise placed directly onto shuttles, thereby reducing process complexity and eliminating intermediate conveyor belts used during induction. Some embodiments include a distance measuring laser sensor disposed underneath a track, with one or more photoelectric sensors disposed along a side of the track to identify shuttles and associate a corresponding height measurement.

As a result of the improve functionality provided by the shuttle height systems described herein, flexibility and throughput of the processing of items at the fulfillment center may be increased, such as by streamlining maintenance processes and improving shuttle performance. Some embodiments include optimized process flows for processing of orders at fulfillment centers, as well as process flows or methods to increase speed of consolidating products in a multi-item order as a result of improved speed in transportation of items and/or containers. As a result, throughput of fulfillment centers may be improved, and/or logistics of fulfillment center operations may be less complicated.

Referring to FIG. 1, an example use case 100 for shuttle height monitoring systems for shuttles powered by linear synchronous motors is depicted in accordance with one or more embodiments of the disclosure. Although discussed in the context of online orders, other embodiments may be directed to any suitable use case where containers or items are transported, such as instances where objects are picked from inventory, placed into containers, containers or items are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include rails that may be used to guide shuttles from one location to another. The rails may be used with shuttle height systems described herein.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of items and/or containers by shuttles, or shuttle movement, occurs, systems as described herein may be used for height monitoring for shuttles powered by linear synchronous motors.

Embodiments of the disclosure include systems and methods for shuttle height monitoring systems for shuttles powered by linear synchronous motors. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
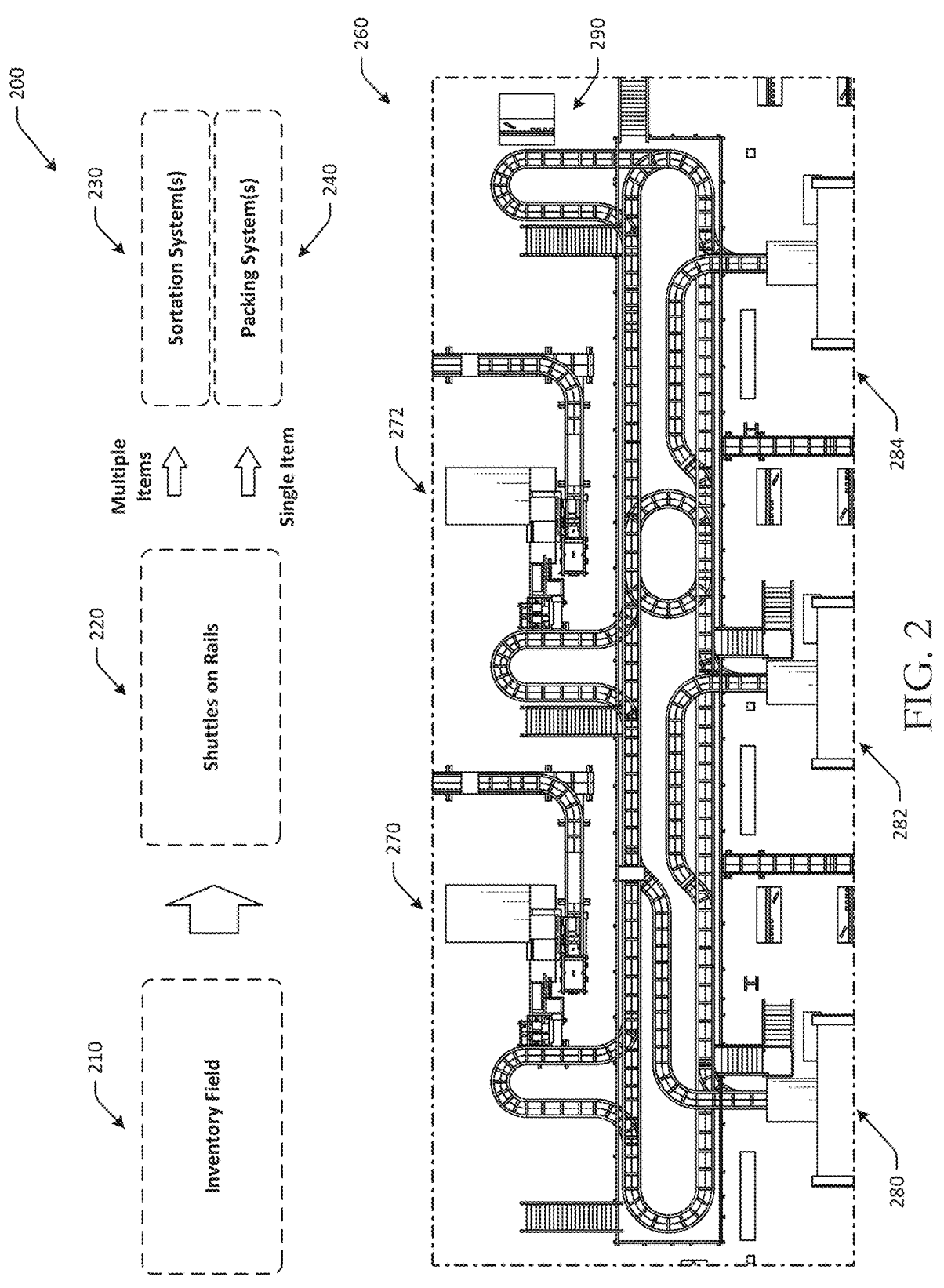
FIG. 2 is a schematic illustration of an example use case and facility layout for shuttle height monitoring systems for shuttles powered by linear synchronous motors in accordance with one or more embodiments of the disclosure.

FIG. 2 is a schematic illustration of an example use case 200 and facility layout for shuttle height monitoring systems for shuttles powered by linear synchronous motors in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using robots, vehicles, or a combination thereof.

The picked products may be placed into one or more containers and the items may be removed from the containers and inducted onto one or more shuttles for transport, such as one or more shuttles on rails 220. The shuttles on rails 220 may include shuttles that are configured to transport items without containers from one location to another via rails. The rails may include switching rail components that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using switching rail components. The rail system 260 may include rails that link various systems, such as sortation systems, to each other and/or to other systems, such as container handling systems, manual induction systems 290, and so forth. For example, the rail system 260 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor surface, such as a belt, that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off the conveyor belt. The shuttles may include an on-board drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3:
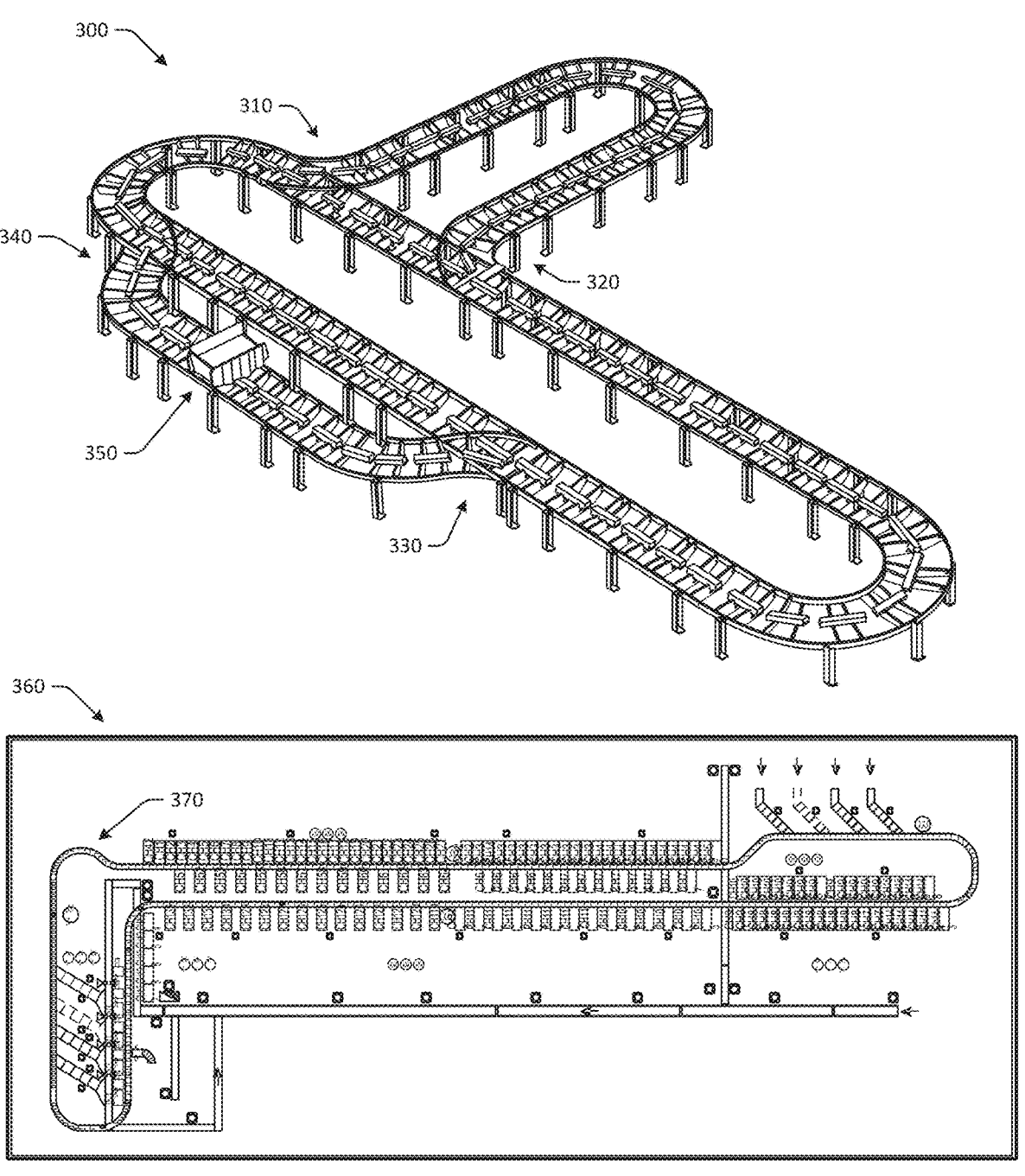
FIG. 3 is a schematic illustration of a perspective view and a close-up view of a shuttle rail system in accordance with one or more embodiments of the disclosure.

FIG. 3 is a schematic illustration of a perspective view and a close-up view of a shuttle rail system 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may be used with the systems for height monitoring discussed with respect to FIGS. 1-2, and/or may be used with any of the systems described herein.

The shuttle rail system 300 may be configured to provide continuous rail for switching the direction of a shuttle 350 in an electromagnetically propelled shuttle-on-rail arrangement. Shuttle-on-rail arrangements may be used in many systems, such as sortation systems, pick systems, delivery systems, etc. The shuttle rail system 300 may include rail switch mechanisms to allow the rail to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a very narrow gap for optimal performance. Such factors may be impacted by the weight of the payload on the shuttles, which may be increased due to a container weight. Such issues may be avoided by embodiments of the disclosure, where items can be directly placed onto shuttles for transport.

The shuttle rail system 300 may include a first branched path 310, where if shuttles were moving along the shuttle rail system 300 in a clockwise direction, the shuttle could move in either a straight direction along the oval path of the shuttle rail system 300, or may make a left-handed curve onto a separate path of the shuttle rail system 300. Similarly, a second branched path 320 may allow for merging of shuttles that took a left curve at the first branched path 310 to merge back onto the oval path of the shuttle rail system 300. Any number of curved path and straight path intersections may be included in the shuttle rail system 300. For example, the shuttle rail system 300 may include a third branched path 330 and a fourth branched path 340. The shuttle rail system 300 may form a closed loop track in some embodiments.

An induction path may be connected to the shuttle rail system 300 and may be accessible via the shuttle rail system 300. For example, the shuttle 350 moving along the shuttle rail system 300 is depicted positioned along an induction path, where an operator may induct items onto the shuttle 350 for transport.

In some embodiments, the shuttle height monitoring systems described herein may be deployed along a closed loop track 360, where shuttles may move in a sequential order along the track 360. In such embodiments, the shuttle height monitoring systems may be disposed along the track at particular locations 370, where more than one shuttle height monitoring system may be included in the system. Height monitoring systems may be disposed adjacent to the tracks and/or underneath the track at one or more different locations along the track, and may be used to capture images or other data of the shuttle and/or shuttle height as the shuttle moves past the monitoring system. The data may be associated with the shuttle and used to track wear over time for individual shuttles.

Figure 4A:
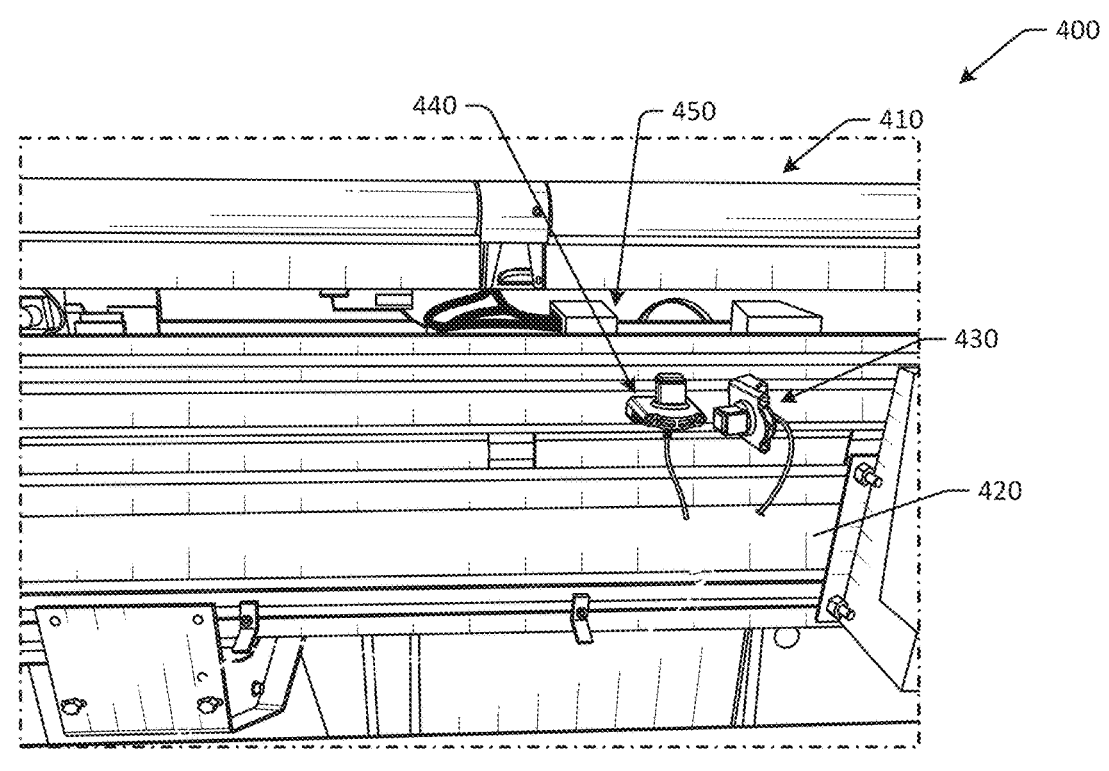
FIGS. 4A-4B are schematic illustrations of various views of a shuttle height monitoring system in accordance with one or more example embodiments of the disclosure.
Figure 4A:
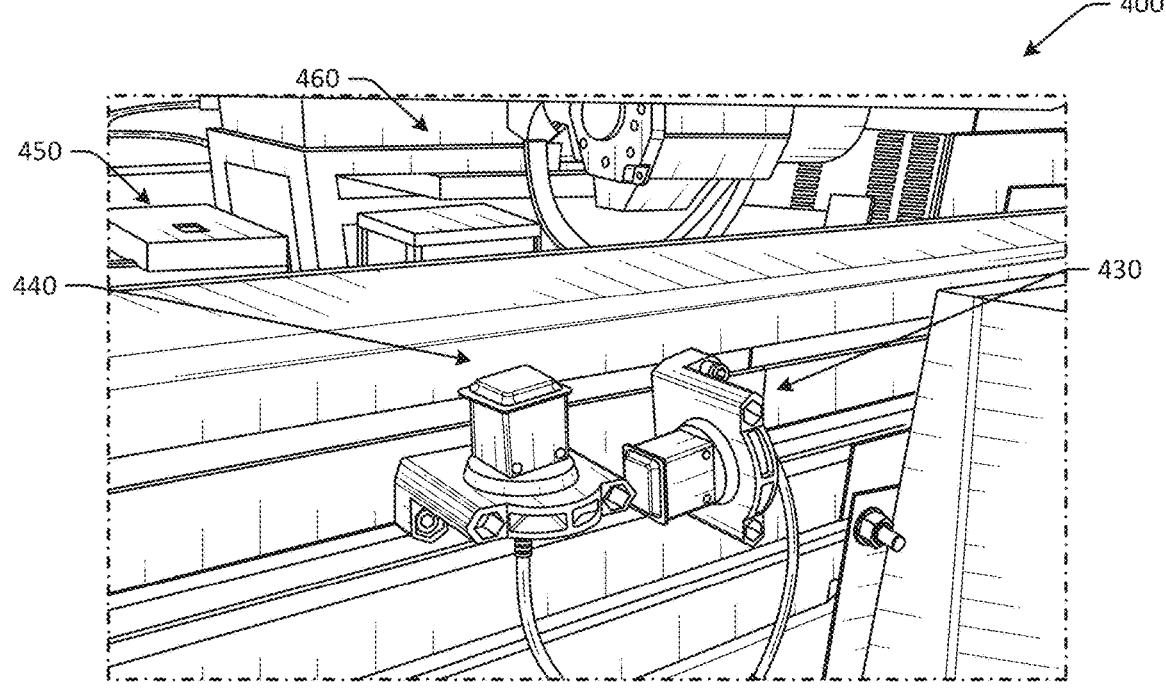
Figure 4B:
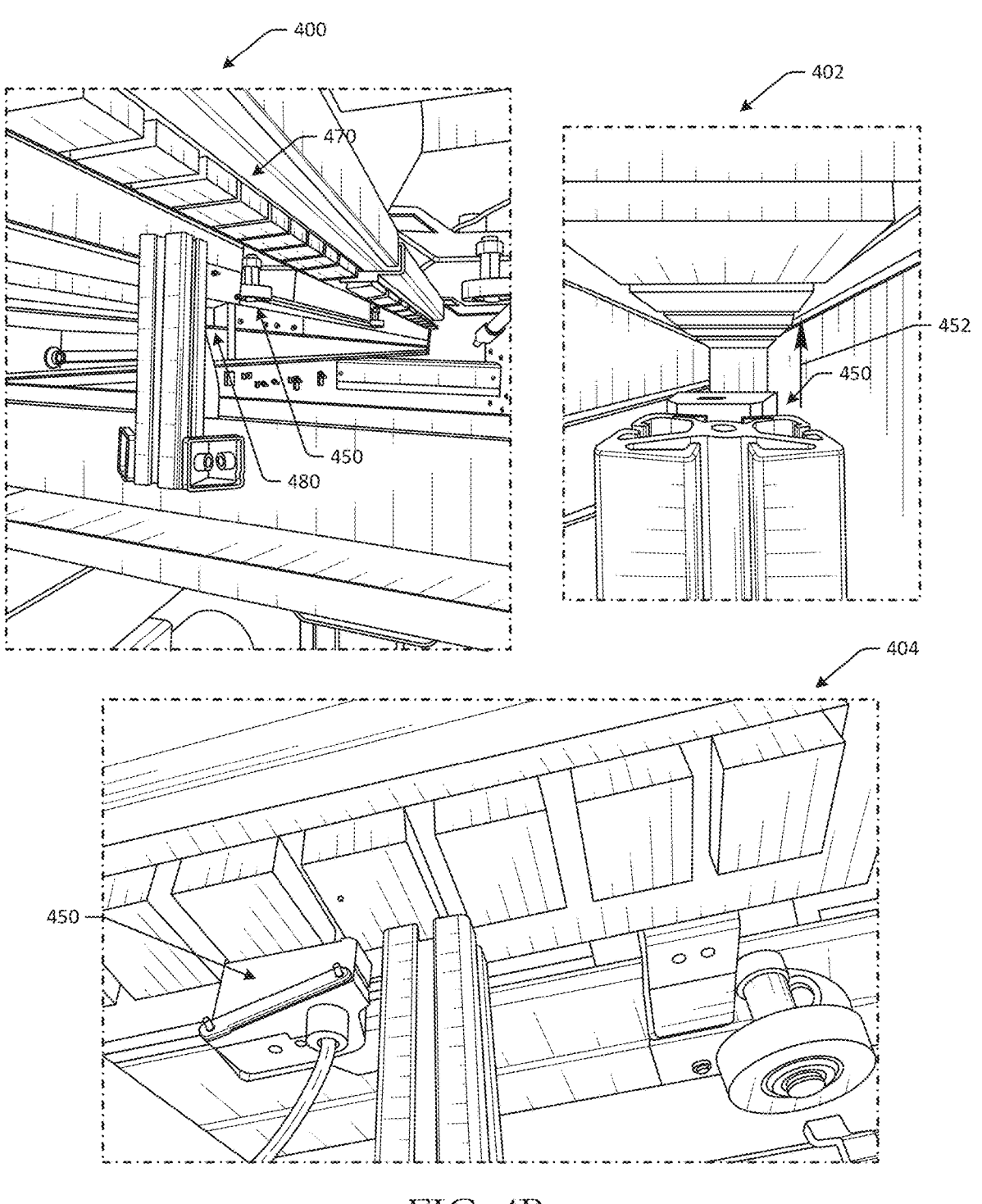

FIGS. 4A-4B are schematic illustrations of various views of a shuttle height monitoring system 400 in accordance with one or more example embodiments of the disclosure. Other embodiments may include additional or fewer components. The illustration of FIGS. 4A-4B are not to scale, and may not be illustrated to scale with respect to other figures. The height monitoring systems described herein may be used with the same shuttle and shuttle rail system discussed with respect to FIGS. 1-4B.

In FIG. 4A, a system 400 may be configured to determine shuttle height for individual shuttles as the shuttles move along a track 410. The track 410 may include one or more rail segments 420 that form sides of the track 410 to support shuttles moving along the track. The system 400 may include a first sensor 430 and a second sensor 440. The first sensor 430 and/or the second sensor 440 may be photoelectric sensors or photo eye sensors in some embodiments. In other embodiments, the first sensor 430 and/or the second sensor 440 may be a different type of sensor, such as a camera, a depth sensor, or other type of sensor. The first sensor 430 and/or the second sensor 440 may be disposed along a side of the track 410, such as along an external or outer side of the rail segment 420. The first sensor 430 and the second sensor 440 may be used for identification of shuttle presence and to identify shuttles for association of corresponding height measurements.

The system 400 may include a third sensor 450 that is disposed underneath the track 410. The third sensor 450 may be a laser distance sensor in one embodiment. In other embodiments, the third sensor 450 may be a different type of sensor configured to measure distance. The third sensor 450 may be configured to determine a distance between the third sensor 450 and a lower portion of a shuttle 460, such as a permanent magnet coupled to the lower portion of the shuttle 460. The distance measurement may be a proxy for shuttle height, where the distance is reduced as the shuttle height relative to the track 410 decreases.

The first sensor 430 may be disposed in a sideways-facing arrangement, as depicted in FIG. 4A, where the first sensor 430 is oriented towards the second sensor 440. The first sensor 430 may be configured to determine when the first shuttle in a sequence of shuttles moving along the track 410 approaches the third sensor 450.

The second sensor 440 may be disposed in an upwards-facing arrangement, as depicted in FIG. 4A, where the second sensor 440 is oriented towards the lower portion of the shuttle 460. The second sensor 440 may be configured to determine when subsequent shuttles after the first shuttle in the sequence of shuttles moving along the track 410 approach the third sensor 450.

In this manner, the first sensor 430 and the second sensor 440 can be used to determine which particular shuttle is approaching the third sensor 450, and the third sensor 450 can be triggered to determine a height measurement of the shuttle. The resulting height measurement can be associated with the particular shuttle identifier determined using the first sensor 430 and/or the second sensor 440. In particular, the system 400 may use inputs from the first sensor 430 and the second sensor 440 to increment a shuttle counter, where after the first shuttle is known, the subsequent shuttles can be identified in sequence. The first sensor 430 may be used to identify the first shuttle in the sequence and the second sensor 440 may be used to identify the subsequent shuttles, as the first sensor 430 may be oriented to identify a trigger associated with the first shuttle. In one example, the controller of the system may be configured to determine that the first shuttle is a first shuttle and the second shuttle is a last shuttle in a sequence of shuttles moving along the track, and cause an increment counter to be reset to 1, where an increment counter value of 1 indicates a subsequent distance value is associated with the first shuttle. As a result, positive identification of shuttles may not be needed.

In FIG. 4B, the system is depicted in lower perspective views 402 and 404, where a shuttle height 452 can be determined by the third sensor 450. The third sensor 450 may be arranged in between gaps 470 along other components of a central rail of the track 410. In some embodiments, the third sensor 450 can be coupled to a support 480 along the track 410, and in other embodiments, the third sensor 450 may be located elsewhere.

Accordingly, the system 400 may include a first laser sensor disposed adjacent to the track, a first photoelectric sensor disposed adjacent to the track, and a second photoelectric sensor disposed adjacent to the first photoelectric sensor. The system 400 may include a controller configured to determine, using the second photoelectric sensor, that the first shuttle is adjacent to the first laser sensor, cause the first laser sensor to determine a first distance between the first permanent magnet and the first laser sensor, and determine a first wear status of the first shuttle based at least in part on the first distance.

Figure 5B:
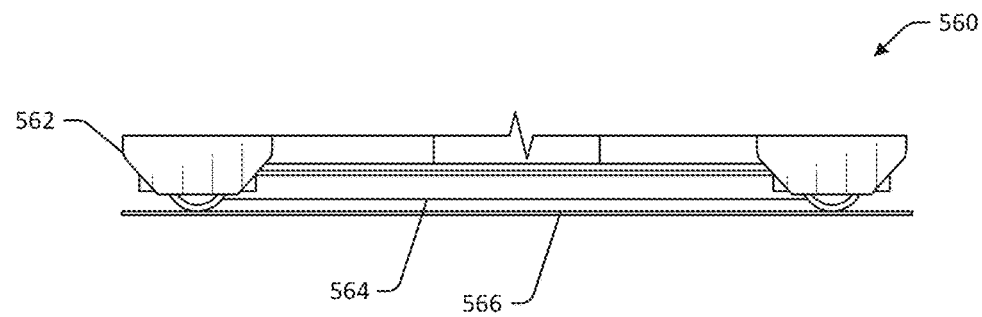
Figure 5B:
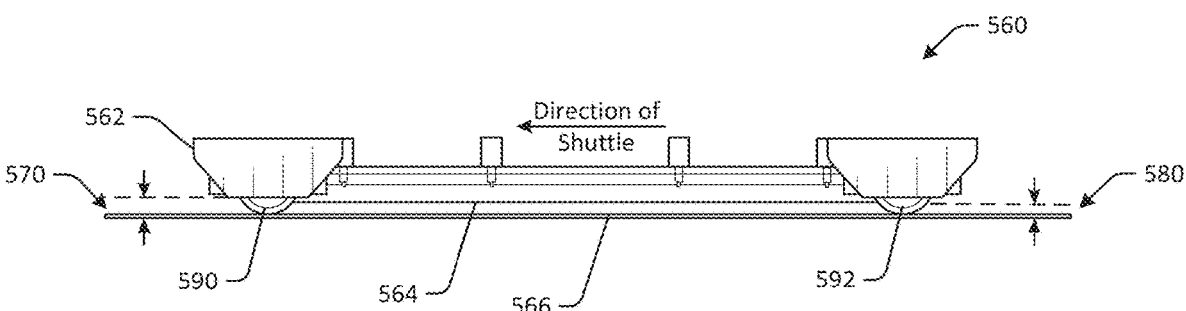

FIGS. 5A-5B are schematic illustrations of various views of a shuttle height monitoring system user interface and shuttle height changes over time in accordance with one or more example embodiments of the disclosure. Other embodiments may include additional or fewer components. The illustration of FIGS. 5A-5B are not to scale, and may not be illustrated to scale with respect to other figures. The system illustrated in FIGS. 5A-5B may include the same height monitoring systems discussed with respect to FIGS. 1-4B.

Over time, the repeated motion of shuttles on the track can lead to component wear. This wear may reduce the vertical gap between the permanent magnet of the shuttle and the electromagnet disposed along the track, as well as the lateral gap between the track sidewalls and the shuttle, both of which can pose risks to operational efficiency. Embodiments may observe shuttle conditions, log data with corresponding shuttle identifiers, identify problematic wheels, and provide additional information for maintenance or repair actions.

In FIG. 5A, a user interface 500 of a height monitoring system 500 for monitoring shuttle height is depicted. The user interface 500 may present most recent shuttle height measurements in correlation with shuttle identifiers, such that an operator can view height data in a single dashboard. The user interface 500 may include a configurable threshold, where heights equal to or less than the threshold, or within a certain amount of the threshold, can be presented with a visual indicator, such as in a different color, with a border box, highlighted, or other visual indicator. For example, in FIG. 5A, the shuttle identifiers for Shuttles 336, 337, 338, 339, 349, and 443 may be highlighted as being within 0.55 millimeters of the 2.0 millimeter threshold. This may allow operators to observe the shuttles more closely. In some embodiments, shuttles with heights equal to or less than the threshold may be automatically routed to a maintenance bay for repairs prior to failure.

An example process flow 510 is depicted in FIG. 5A. The process flow 510 may executed by one or more computer systems associated with the shuttle rail system. The process flow 510 may be executed to determine shuttle height statuses and whether any shuttles should be automatically routed to maintenance.

At block 520 of the process flow 510, a controller may determine, using a third sensor, such as the sideways-facing photoelectric sensor of FIG. 4A, that a first shuttle is adjacent to a first sensor, where the first sensor is the laser sensor of FIG. 4A. The first shuttle may be a first shuttle in a sequence of shuttles. The third sensor may be used to determine the first shuttle in a sequence, after which the second sensor, which may be the upwards-facing photoelectric sensor of FIG. 4A, may be used to identify second and subsequent shuttles after the first shuttle.

At block 530 of the process flow 510, the controller may determine, using the second sensor, such as a laser sensor, a first distance between a first lower portion of the first shuttle (e.g., the permanent magnet underneath the first shuttle, etc.) and the second sensor.

At block 540 of the process flow 510, the controller may determine, using a third sensor, such as the upwards-facing photoelectric sensor, that a second or subsequent shuttle is adjacent to the second sensor.

At block 550 of the process flow 510, the controller may determine, using the second sensor, a second distance between a second lower portion of a second shuttle and the second sensor.

The corresponding measurements may be stored in association with the respective shuttle identifiers, and may optionally be presented at a user interface, such as that depicted in FIG. 5A. Accordingly, in some embodiments, the controller may be configured to cause the first distance to be stored in association with a first shuttle identifier of the first shuttle, and cause the second distance to be stored in association with a second shuttle identifier of the second shuttle. The controller may therefore cause presentation of the second distance and the third distance at a display. Certain distances can be presented with a visual indicator indicating a particular shuttle is due for maintenance.

Measurements may be continuously updated as the same shuttle moves past the sensors. For example, the first distance may be determined at a first time interval, and the controller may be configured to determine, using the third sensor at a second time interval, that the first shuttle is adjacent to the first sensor, and determine, using the first sensor, a third distance between the first lower portion of the first shuttle and the first sensor. The controller may determine that the third distance is less than the first distance, indicating a reduced shuttle height, and may cause the third distance to be stored in association with the first shuttle identifier, where the third distance overwrites the first distance. In this manner, the most recent height may be presented for a shuttle. In other embodiments, the lowest measured height for a particular shuttle may be presented, so as to account for slight deviations in measurements over time. Other manipulations, such as averages of the last two measurements, etc. may be used to determine a height value to store and/or present in association with a shuttle.

For shuttles having heights at or below a threshold, the controller may, in one example, determine that the third distance is less than a threshold value, determine that the first shuttle is due for maintenance based at least in part on the third value, and cause the first shuttle to be automatically routed to a maintenance station. In some embodiments, the measured values may be considered wear statuses, which may incorporate factors in addition to shuttle height, such as time since last maintenance interval, etc. In such instances, the controller may be configured to determine that the first shuttle is due for maintenance based at least in part on the first wear status, and cause the first shuttle to be automatically routed to a maintenance station.

Accordingly, a system for monitoring shuttle wear of a first shuttle and a second shuttle can include a track having a first rail segment that forms a first side of the track, and a second rail segment that forms a second side of the track. The system can include a first sensor disposed adjacent to the track, a second sensor disposed adjacent to the track, and a third sensor disposed adjacent to the second sensor. One or more of the second sensor and the third sensor may be photoelectric sensors. The second sensor can be disposed in an upwards-facing orientation, and the third sensor can be disposed in a sideways-facing orientation. For instance, a first photoelectric sensor is oriented in a vertical position and a second photoelectric sensor is oriented in a horizontal position. The system may include a controller configured to determine, using the third sensor, that the first shuttle is adjacent to the first sensor, determine, using the first sensor, a first distance between a first lower portion of the first shuttle and the first sensor, determine, using the second sensor, that the second shuttle is adjacent to the first sensor, and determine, using the first sensor, a second distance between a second lower portion of the second shuttle and the first sensor.

In some embodiments, for instances where more than two shuttles are moving along a closed loop track in sequence, the controller may be configured to determine, using the first photoelectric sensor, that the second shuttle is adjacent to the first laser sensor, cause the first laser sensor to determine a second distance between the second permanent magnet and the first laser sensor, determine a second wear status of the second shuttle based at least in part on the second distance, cause presentation of the first wear status and the second wear status at a display, where the first wear status is presented with a visual indicator indicating the first shuttle is due for maintenance.

In FIG. 5B, example shuttle height changes due to wheel wear is depicted. A shuttle 560 is depicted moving along a track 566. The shuttle 560 may be propelled along the track 566 via interaction between a permanent magnet 564 of the shuttle 560 and electromagnets disposed along the track 520.

As the shuttle 560 moves along the track 566, wheels 590, 592 of the shuttle may deteriorate and cause a shuttle height at a first end 570 to decrease. The individual wheels 590, 592 may be coupled to wheel blocks 562 that may contact the track 566 and cause failure. Uneven wear can also lead to failure, and as a result, a shuttle height at a second end 580 may be different than the shuttle height at the first end 570. Systems as described herein may account for such issues without needing individual wheel measurement or measurement of other shuttle components.

Figure 6:
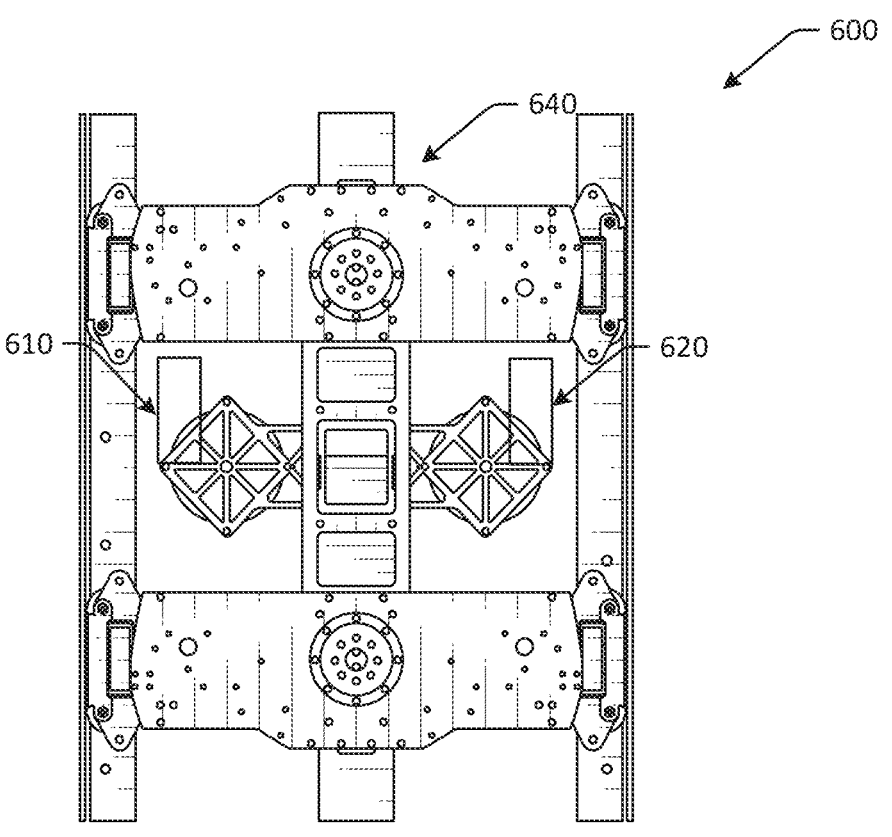
FIG. 6 is a schematic illustration of a bottom view of a shuttle in accordance with one or more embodiments of the disclosure.

FIG. 6 is a schematic illustration of a bottom view of a shuttle in accordance with one or more embodiments of the disclosure. Other embodiments may include additional or fewer components. The illustration of FIG. 6 is not to scale, and may not be illustrated to scale with respect to other figures. The system illustrated in FIG. 6 may be used with the same shuttle rail systems discussed with respect to FIGS. 1-5B.

In FIG. 6, a shuttle height monitoring system 600 may have the same laser sensor to measure distance underneath a track 640 as discussed herein, but the laser sensor may be offset from center. For example, a first laser sensor 610 may be disposed on a first lateral side of the track 640, and an optional second laser sensor 620 may be disposed on a second lateral side of the track 640. Accordingly, deployment of the system may be flexible with respect to space constraints.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
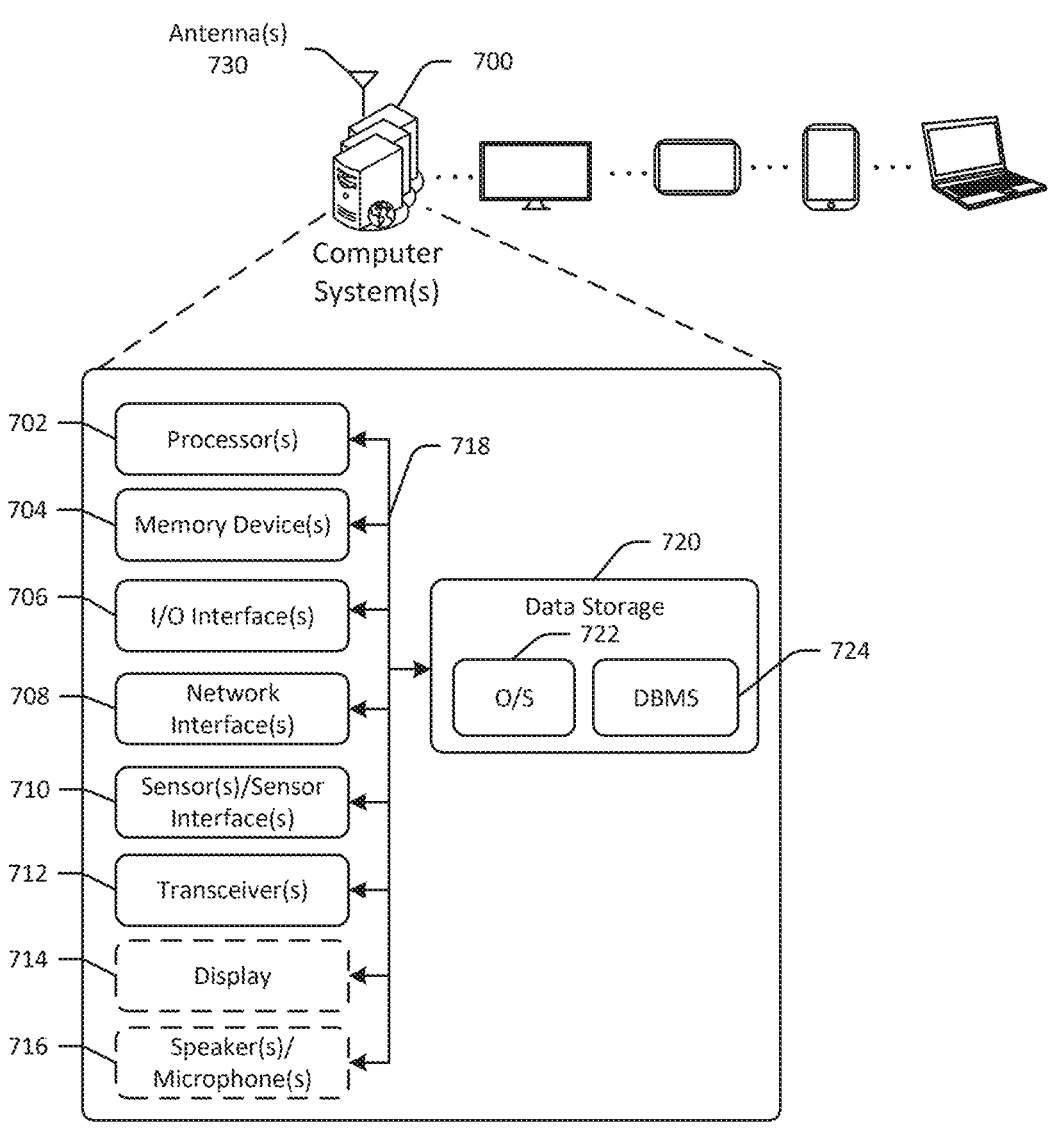
FIG. 7 schematically illustrates an example architecture of a computer system associated with a shuttle height monitoring system in accordance with one or more embodiments of the disclosure.

FIG. 7 is a schematic block diagram of one or more illustrative computer system(s) 700 associated with a height monitoring system in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the controller(s) of FIGS. 1-6. For example, the computer system(s) 700 may be a controller and may independently control one or more aspects of the shuttle height monitoring systems described in FIGS. 1-6.

The computer system(s) 700 may be configured to communicate with one or more servers, user devices, or the like. The computer system(s) 700 may be configured to cause images to be captured, determination shuttle height status, identify shuttles, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), Fire Wire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving-potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
a track having a central axis, the track comprising a first rail segment on a first side of the central axis and a second rail segment on a second side of the central axis;
a first shuttle configured to transport one or more items from a first location to a second location using the track, the first shuttle comprising a first permanent magnet and a first conveyor assembly having a central axis that is transverse to the central axis of the track, wherein the first shuttle is configured to support the one or more items on the first conveyor assembly;
a second shuttle configured to move along the track, the second shuttle comprising a second permanent magnet;
a set of electromagnets disposed along the central axis of the track, wherein the set of electromagnets interact with the first and second permanent magnets to propel the first shuttle and the second shuttle, respectively;
a first laser sensor disposed adjacent to the track;
a first photoelectric sensor disposed adjacent to the track;
a second photoelectric sensor disposed adjacent to the first photoelectric sensor; and
a controller configured to:
determine, using the second photoelectric sensor, that the first shuttle is adjacent to the first laser sensor;
cause the first laser sensor to determine a first distance between the first permanent magnet and the first laser sensor; and
determine a first wear status of the first shuttle based at least in part on the first distance.

2. The system of claim 1, wherein the controller is further configured to:
determine that the first shuttle is due for maintenance based at least in part on the first wear status; and
cause the first shuttle to be automatically routed to a maintenance station.

3. The system of claim 2, wherein the controller is further configured to:
determine, using the first photoelectric sensor, that the second shuttle is adjacent to the first laser sensor;

cause the first laser sensor to determine a second distance between the second permanent magnet and the first laser sensor;

determine a second wear status of the second shuttle based at least in part on the second distance;

cause presentation of the first wear status and the second wear status at a display, wherein the first wear status is presented with a visual indicator indicating the first shuttle is due for maintenance.

4. The system of claim 1, wherein the first photoelectric sensor is oriented in a vertical position and the second photoelectric sensor is oriented in a horizontal position.

5. A system for monitoring shuttle wear of a first shuttle and a second shuttle, the system comprising:

a track comprising a first rail segment that forms a first side of the track, and a second rail segment that forms a second side of the track;

a first sensor disposed adjacent to the track;

a second sensor disposed adjacent to the track;

a third sensor disposed adjacent to the second sensor; and a controller configured to:

determine, using the third sensor, that the first shuttle is adjacent to the first sensor;

determine, using the first sensor, a first distance between a first lower portion of the first shuttle and the first sensor;

determine, using the second sensor, that the second shuttle is adjacent to the first sensor; and determine, using the first sensor, a second distance between a second lower portion of the second shuttle and the first sensor.

6. The system of claim 5, wherein the second sensor and the third sensor are photoelectric sensors; and wherein the second sensor is disposed in an upwards-facing orientation, and the third sensor is disposed in a sideways-facing orientation.

7. The system of claim 5, wherein the controller is further configured to:

cause the first distance to be stored in association with a first shuttle identifier of the first shuttle; and cause the second distance to be stored in association with a second shuttle identifier of the second shuttle.

8. The system of claim 7, wherein the first distance is determined at a first time interval, and wherein the controller is further configured to:

determine, using the third sensor at a second time interval, that the first shuttle is adjacent to the first sensor;

determine, using the first sensor, a third distance between the first lower portion of the first shuttle and the first sensor;

determine that the third distance is less than the first distance; and cause the third distance to be stored in association with the first shuttle identifier, wherein the third distance overwrites the first distance.

9. The system of claim 8, wherein the controller is further configured to:

determine that the third distance is less than a threshold value;

determine that the first shuttle is due for maintenance based at least in part on the third value; and generate a notification that the first shuttle is due for maintenance.

10. The system of claim 9, wherein the controller is further configured to:

cause presentation of the second distance and the third distance at a display.

11. The system of claim 10, wherein the third distance is presented with a visual indicator indicating the first shuttle is due for maintenance.

12. The system of claim 5, wherein the track is a closed-loop track.

13. The system of claim 12, wherein the controller is further configured to:

determine that the first shuttle is a first shuttle and the second shuttle is a last shuttle in a sequence of shuttles moving along the track; and cause an increment counter to be reset to 1, wherein an increment counter value of 1 indicates a subsequent distance value is associated with the first shuttle.

14. The system of claim 5, wherein the first sensor is a laser sensor that is disposed underneath the track, and wherein the second sensor and the third sensor are disposed along the first side or the second side of the track.

15. The system of claim 5, wherein the first shuttle comprises a conveyor and a permanent magnet that forms the first lower portion; and wherein the track comprises an electromagnet disposed along the track, wherein the first shuttle is propelled via interaction between the electromagnet and the permanent magnet.

16. A system comprising:

a track comprising a first rail segment and a second rail segment, wherein the first rail segment forms a first side of the track, and the second rail segment forms a second side of the track;

a first shuttle configured to move along the track;

a second shuttle configured to move along the track;

a first sensor disposed adjacent to the track;

a second sensor disposed adjacent to the track;

a third sensor disposed adjacent to the second sensor; and a controller configured to:

determine, using the third sensor, that the first shuttle is adjacent to the first sensor;

determine, using the first sensor, a first distance between a first lower portion of the first shuttle and the first sensor;

determine, using the second sensor, that the second shuttle is adjacent to the first sensor; and determine, using the first sensor, a second distance between a second lower portion of the second shuttle and the first sensor.

17. The system of claim 16, wherein the second sensor and the third sensor are photoelectric sensors; and wherein the second sensor is disposed in an upwards-facing orientation, and the third sensor is disposed in a sideways-facing orientation.

18. The system of claim 16, wherein the controller is further configured to:

cause the first distance to be stored in association with a first shuttle identifier of the first shuttle; and cause the second distance to be stored in association with a second shuttle identifier of the second shuttle.

19. The system of claim 18, wherein the first distance is determined at a first time interval, and wherein the controller is further configured to:

determine, using the third sensor at a second time interval, that the first shuttle is adjacent to the first sensor;

determine, using the first sensor, a third distance between the first lower portion of the first shuttle and the first sensor;

determine that the third distance is less than the first distance; and cause the third distance to be stored in association with the first shuttle identifier, wherein the third distance overwrites the first distance.

20. The system of claim 19, wherein the controller is further configured to:

determine that the third distance is less than a threshold value;

determine that the first shuttle is due for maintenance based at least in part on the third value; and cause the first shuttle to be automatically routed to a maintenance station.

* * * * *